United States Patent
Eguchi et al.

(10) Patent No.: US 10,859,736 B2
(45) Date of Patent: Dec. 8, 2020

(54) OPTICAL SHEET, POLARIZING PLATE, OPTICAL SHEET SORTING METHOD, OPTICAL SHEET PRODUCTION METHOD, AND DISPLAY DEVICE

(71) Applicant: DAI NIPPON PRINTING CO., LTD., Tokyo (JP)

(72) Inventors: Junya Eguchi, Okayama (JP); Yoshinari Matsuda, Tsukuba (JP); Hiroyuki Morikane, Tsukuba (JP); Shubou Taya, Okayama (JP); Yuki Tobe, Okayama (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 246 days.

(21) Appl. No.: 15/765,918

(22) PCT Filed: Oct. 5, 2016

(86) PCT No.: PCT/JP2016/079670
§ 371 (c)(1),
(2) Date: Aug. 29, 2018

(87) PCT Pub. No.: WO2017/061493
PCT Pub. Date: Apr. 13, 2017

(65) Prior Publication Data
US 2018/0364400 A1    Dec. 20, 2018

(30) Foreign Application Priority Data

Oct. 9, 2015 (JP) .................................. 2015-201134

(51) Int. Cl.
| | |
|---|---|
| *G02B 5/02* | (2006.01) |
| *B32B 3/26* | (2006.01) |
| *G09F 9/00* | (2006.01) |
| *G02B 5/30* | (2006.01) |

(52) U.S. Cl.
CPC ............. *G02B 5/0226* (2013.01); *B32B 3/26* (2013.01); *G02B 5/0268* (2013.01); *G09F 9/00* (2013.01); *G02B 5/3025* (2013.01)

(58) Field of Classification Search
None
See application file for complete search history.

(56) References Cited

U.S. PATENT DOCUMENTS

| | | | |
|---|---|---|---|
| 7,839,474 B2 | 11/2010 | Kameshima et al. | |
| 8,318,301 B2 | 11/2012 | Ibuki et al. | |
| 2005/0063066 A1 | 3/2005 | Namioka et al. | |
| 2008/0130123 A1 | 6/2008 | Namioka et al. | |
| 2008/0186582 A1 | 8/2008 | Matsuura et al. | |
| 2009/0059377 A1 | 3/2009 | Kameshima et al. | |
| 2010/0079701 A1* | 4/2010 | Murayama | G02B 5/0226 349/64 |
| 2013/0063492 A1* | 3/2013 | Washington | G09G 5/003 345/660 |

FOREIGN PATENT DOCUMENTS

| | | |
|---|---|---|
| CN | 101114028 | 1/2008 |
| JP | 2008191310 A | 8/2008 |
| JP | 2009058862 A | 3/2009 |
| JP | 2011112964 A | 6/2011 |
| JP | 2011215515 A | 10/2011 |
| WO | 2015/050274 | 4/2015 |
| WO | 2015163328 A1 | 10/2015 |
| WO | 2016043014 A1 | 3/2016 |

OTHER PUBLICATIONS

Sera ("Surface Roughness" JIS B 0601-2001) (Year: 1994).*
International Search Report issued for International Patent Application No. PCT/JP2016/079670, dated Jan. 10, 2017, 5 pages including English translation.

* cited by examiner

*Primary Examiner* — Darryl J Collins
*Assistant Examiner* — Journey F Sumlar
(74) *Attorney, Agent, or Firm* — Hamre, Schumann, Mueller & Larson, P.C.

(57) ABSTRACT

Provided is an optical sheet which is excellent in anti-glare property, contrast, and image clarity, as well as capable of displaying a powerful moving image, wherein at least one surface of the optical sheet is an uneven surface, and the uneven surface satisfies following conditions (1) to (3), provided that $Rz_{0.8}$ is a ten-point average roughness according to JIS B0601: 1994 with a cut-off value of 0.8 mm, $Rz_{0.25}$ is a ten-point average roughness according to JIS B0601: 1994 with a cut-off value of 0.25 mm, and SD is a standard deviation of an arithmetic average roughness $Ra_{0.8}$ according to JIS B0601: 1994 with a cut-off value of 0.8 mm:

$0.300 \ \mu m \leq Rz_{0.8} \leq 0.650 \ \mu m$ (1)

$0.170 \ \mu m \leq Rz_{0.25} \leq 0.400 \ \mu m$ (2)

$SD \leq 0.015 \ \mu m$ (3).

11 Claims, No Drawings

OPTICAL SHEET, POLARIZING PLATE, OPTICAL SHEET SORTING METHOD, OPTICAL SHEET PRODUCTION METHOD, AND DISPLAY DEVICE

TECHNICAL FIELD

The present invention relates to an optical sheet, a polarizing plate, a method for selecting an optical sheet, a method for manufacturing an optical sheet, and a display device.

BACKGROUND ART

In some cases, display devices such as a mobile information terminal device, a PC monitor, and a TV monitor are provided on the outermost surface thereof with an optical sheet having an uneven structure with an anti-glare property in order to prevent reflection of an external light, etc.

However, when the optical sheet having an anti-glare property is used, the external light diffuses due to the uneven structure, so that it can cause a decrease in contrast.

The decrease in the contrast is caused by excessive diffusion of the external light due to the uneven structure. Therefore, in a past, the uneven structure has been controlled in a proper state by arithmetic average roughness Ra and ten-point average roughness Rz according to JIS B0601: 1994 so as to appropriately diffuse the external light thereby balancing between the anti-glare property and the contrast (for example, Patent Literatures 1 and 2).

CITATION LIST

Patent Literature

PTL 1: Japanese Patent Laid-Open Publication No. 2011-215515
PTL 2: Japanese Patent Laid-Open Publication No. 2011-112964

SUMMARY OF INVENTION

Technical Problem

In recent years, ultrahigh-definition has been further advanced in a display element, so that the display element having a pixel density of 250 ppi or more has been realized in an information terminal device. In a TV for household use, a display element with resolution of so-called full high-vision or with resolution of 2K or higher has been realized. The ultrahigh-definition display element mentioned above not only has high image clarity but also can display a lively, powerful moving image.

However, when an optical sheet provided with a conventional anti-glare property is used in the ultrahigh-definition display element, there has been a problem that the image clarity as well as the powerfulness in the moving image can be lost.

Namely, the optical sheet provided with a conventional anti-glare property could provide the conventional display element with a good balance between the anti-glare property and the contrast; however, it could not provide the ultrahigh-definition display element with the anti-glare property while keeping the contrast, the image clarity, and the powerfulness in the moving image. In addition, in recent years, shooting a moving image and seeing it with a mobile information terminal device are increasing, so that display of a lively, powerful moving image is being wanted.

The present invention was made under the circumstance mentioned above, and thus, it has an object to provide an optical sheet, a polarizing plate, and a display device, which are excellent in anti-glare property, contrast, and image clarity, as well as capable of displaying a powerful moving image. In addition, the present invention has an object to provide: a method for selecting an optical sheet which is excellent in anti-glare property, contrast, and image clarity, as well as capable of displaying a powerful moving image; and a method for producing the same.

Solution to Problem

Inventors of the present invention carried out an extensive study to solve the problem mentioned above, and as a result, they found that the problem could be solved when the surface shape is designed, not by using usual method in which a certain cut-off value based on surface roughness as described in JIS B0601: 1994 is used, but by daring to use two cut-off values as well as to take the variance in the surface shape into consideration; on the basis of this finding, the present invention could be accomplished.

Namely, the present invention provides an optical sheet, a polarizing plate, a method for selecting an optical sheet, a method for manufacturing an optical sheet, and a display device, as described in the following [1] to [6].

[1] An optical sheet, wherein at least one surface of the optical sheet is an uneven surface, and the uneven surface satisfies following conditions (1) to (3), provided that $Rz_{0.8}$ is a ten-point average roughness according to JIS B0601: 1994 with a cut-off value of 0.8 mm, $Rz_{0.25}$ is a ten-point average roughness according to JIS B0601: 1994 with a cut-off value of 0.25 mm, and SD is a standard deviation of an arithmetic average roughness $Ra_{0.8}$ according to JIS B0601: 1994 with a cut-off value of 0.8 mm:

$$0.300 \text{ μm} \leq Rz_{0.8} \leq 0.650 \text{ μm} \quad (1)$$

$$0.170 \text{ μm} \leq Rz_{0.25} \leq 0.400 \text{ μm} \quad (2)$$

$$SD \leq 0.015 \text{ μm} \quad (3)$$

[2] A polarizing plate, comprising protective films on both sides of a polarizer, wherein at least one of the protective films comprises the optical sheet of [1] with the uneven surface of the optical sheet facing in a direction opposite to the polarizer.

[3] A method for selecting an optical sheet, wherein at least one surface thereof is an uneven surface, comprising selecting an optical sheet having an uneven surface which satisfies following conditions (1) to (3), provided that $Rz_{0.8}$ is a ten-point average roughness according to JIS B0601: 1994 with a cut-off value of 0.8 mm, $Rz_{0.25}$ is a ten-point average roughness according to JIS B0601: 1994 with a cut-off value of 0.25 mm, and SD is a standard deviation of an arithmetic average roughness $Ra_{0.8}$ according to JIS B0601: 1994 with a cut-off value of 0.8 mm.

[4] A method for manufacturing an optical sheet, wherein at least one surface thereof is an uneven surface, comprising manufacturing the optical sheet in such a way that the uneven surface thereof satisfies following conditions (1) to (3), provided that $Rz_{0.8}$ is a ten-point average roughness according to JIS B0601: 1994 with a cut-off value of 0.8 mm, $Rz_{0.25}$ is a ten-point average roughness according to JIS B0601: 1994 with a cut-off value of 0.25 mm, and SD is a standard deviation of an arithmetic average roughness $Ra_{0.8}$ according to JIS B0601: 1994 with a cut-off value of 0.8 mm.

[5] A display device, comprising one or more optical members disposed on a viewer's side of a display element, and at least one of the optical members comprises the optical sheet according to [1], with the uneven surface of the optical sheet disposed to face the viewer's side.

[6] A display device, comprising one or more optical members disposed on a viewer's side of a display element, and at least one of the optical members comprises the polarizing plate according to [2], with the uneven surface of the optical sheet of the polarizing plate is disposed to face the viewer's side.

Advantageous Effects of Invention

The optical sheet, polarizing plate, and display device of the present invention are excellent in anti-glare property, contrast, and image clarity, as well as capable of displaying a powerful moving image.

In addition, according to the method for selecting the optical sheet of the present invention, even without incorporating the optical sheet into a display device, the performance can be guaranteed that the optical sheet is excellent in anti-glare property, contrast, and image clarity as well as capable of displaying a powerful moving image, and quality of the optical sheet can be efficiently controlled. Further, according to the method for manufacturing the optical sheet of the present invention, the optical sheet which is excellent in anti-glare property, contrast, and image clarity, as well as capable of displaying a powerful moving image can be efficiently manufactured.

DESCRIPTION OF EMBODIMENTS

[Optical Sheet]

The optical sheet of the present invention is the optical sheet whose at least one surface is an uneven surface, and the uneven surface satisfies the following conditions (1) to (3), provided that $Rz_{0.8}$ is a ten-point average roughness according to JIS B0601: 1994 with a cut-off value of 0.8 mm, $Rz_{0.25}$ is a ten-point average roughness according to JIS B0601: 1994 with a cut-off value of 0.25 mm, and SD is a standard deviation of an arithmetic average roughness $Ra_{0.8}$ according to JIS B0601: 1994 with a cut-off value of 0.8 mm:

$$0.300 \text{ μm} \leq Rz_{0.8} \leq 0.650 \text{ μm} \quad (1)$$

$$0.170 \text{ μm} \leq Rz_{0.25} \leq 0.400 \text{ μm} \quad (2)$$

$$SD \leq 0.015 \text{ μm} \quad (3)$$

Uneven Surface:

In the optical sheet of the present invention, at least one surface thereof is an uneven surface, and the uneven surface satisfies the foregoing conditions (1) to (3). In the conditions (1) and (2), the cut-off values are different. The condition (3) uses a parameter different from those of the conditions (1) and (2). Hereunder, technological significances in using different cut-off values (0.8 mm and 0.25 mm) and in specifying different parameters (Rz and Ra) will be described.

The cut-off value is the value representing the cutting degree of the wave component in the cross sectional curve composed of a rough component (high frequency component) and a wave component (low frequency component). In other words, the cut-off value is the value representing the fineness of the filter which cuts off the wave component (low frequency component) from the cross sectional curve. More specifically, when the cut-off value is large, because the filter is rough, a large wave in the wave component (low frequency component) is cut off, but a small wave therein is not cut off. Accordingly, when the cut-off value is large, the value includes more amount of the wave component (low frequency component). On the other hand, when the cut-off value is small, because the filter is fine, most of the wave component (low frequency component) is cut off. Namely, when the cut-off value is small, the value accurately reflects the rough component (high frequency component), hardly including the wave component (low frequency component).

In JIS B0633, which is referred in JIS B0601, it is stipulated that a specific cut-off value (standard length) is used in accordance with the degree of surface roughness. In conventional optical sheets, the surface roughness has been controlled only with the cut-off value of, for example, 0.8 mm.

However, on the basis of only one cut-off value, the surface unevenness cannot be designed with taking into consideration both the rough component (high frequency component) and the wave component (low frequency component), so that there is a limit when designing the surface shape.

The unevenness of the high frequency component transmits the transmitting light through the optical sheet with diffusing to large angles, and also reflects the reflecting light on the optical sheet surface with diffusing to large angles. On the other hand, the unevenness of the low frequency component transmits the transmitting light through the optical sheet with diffusing to around the specular direction, and also reflects the reflecting light on the optical sheet surface with diffusing to around the specular direction. For example, the unevenness of the low frequency component has an action to reduce the reflection around the central portion in the reflection area of the light source (the portion corresponding to the core of the light source) in the entire reflection area; and the unevenness of the high frequency component has an action to reduce the reflection of the area apart from the center of the reflection area of the light source. Therefore, the unevenness of the high frequency component and the unevenness of the low frequency component exert different actions to the transmitting light and reflecting light, thereby further exerting different actions to the performances such as the anti-glare property.

As described above, by using these two cut-off values, not only the surface unevenness can be designed with taking into consideration both the rough component (high frequency component) and the wave component (low frequency component), but also the degrees of diffusion in the transmitting and reflecting lights can be controlled.

The ten-point average roughness Rz is obtained as follows. Namely, the roughness curve with the evaluation length obtained by multiplying the sampled line which is equal to the cut-off value by N is divided into N sections with the same length. The distance Rz' is obtained from the average height of 5 tallest peaks and the average height of 5 deepest valleys in each section. The ten-point average roughness Rz is an arithmetic average value of Rz' of N sections. Therefore, Rz is the value focusing on the high peaks and the deep valleys in the roughness curve. On the other hand, the arithmetic average roughness Ra is the average value of the height of the entire roughness curve.

Namely, both Ra and Rz are indicators to represent the degree of roughness in the roughness curve, wherein Ra represents the average roughness, while Rz represents randomness of the unevenness of the roughness curve. In addition, because Rz focuses on the high peak and deep valley, Rz represents the degree of sharpness of the roughness curve.

Magnitude of Ra represents a transmission degree of the transmitting light through the optical sheet in the specular direction and a reflection degree of the reflecting light on the optical sheet surface in the specular direction. On the other hand, magnitude of Rz represents a diffusive transmission degree of the transmitting light through the optical sheet to large angles and a diffusive reflection degree of the reflecting light on the optical sheet surface to large angles. As described above, Ra and Rz have different actions to the transmitting and reflecting lights.

Accordingly, by specifying different parameters Rz and Ra, not only the surface unevenness can be designed more precisely, but also the diffusion degrees of the transmitting and reflecting lights can be controlled.

As described above, in the present invention, two cut-off values are used, and in addition, different parameters Rz and Ra are specified. By so doing, not only designing of the surface unevenness which has been difficult in the past can be done but also the diffusion degrees of the transmitting and reflecting lights can be controlled.

In the condition (1), $Rz_{0.8}$ (Rz of the low frequency component) is 0.300 μm or more and 0.650 μm or less.

As described before, the unevenness of the low frequency component has an action to reduce the reflection around the central portion in the reflection area of the light source (the portion corresponding to the core of the light source). Also, Rz represents the degree of sharpness of the unevenness, thereby representing the diffusive transmission degree of the transmitting light through the optical sheet to large angles. Namely, the magnitude of $Rz_{0.8}$ contributes to reduction of the reflection in the area around the central portion in the reflection area of the light source (the portion corresponding to the core of the light source), especially the reflection around the edge portion of the area around the central portion.

When $Rz_{0.8}$ is less than 0.300 μm, boundary between around the central portion in the reflection area of the light source and the peripheral portion thereof is clearly recognized, so that the anti-glare property cannot be satisfied. In other words, when $Rz_{0.8}$ is less than 0.300 μm, the core shape of the light source is clearly recognized. On the other hand, when $Rz_{0.8}$ is more than 0.650 μm, both the clarity and luminance of the image decreases, so that a powerful moving image cannot be displayed. In particular, in the ultra-high-definition display element (display element with the horizontal pixel number of 1920 or more, or with the pixel density of 250 ppi or more), the problem in the image clarity as well as in the display of moving image as described above tends to appear.

The condition (1) satisfies preferably 0.310 μm≤$Rz_{0.8}$≤0.550 μm, while more preferably 0.320 μm≤$Rz_{0.8}$≤0.520 μm.

Meanwhile, the present invention, each of the conditions (1), as well as (2) and (4) to (9) to be mentioned later, is an average value of 60 samples, measured once for each sample. In the present invention, the condition (3) to be mentioned later is the standard deviation of $Ra_{0.8}$ of 60 samples, measured once for each sample.

In the condition (2), $Rz_{0.25}$ (Rz of the high frequency component) is 0.170 μm or more and 0.400 μm or less.

As described before, the unevenness of the high frequency component has an action to reduce the reflection in the area apart from the center of the reflection area of the light source. Also, Rz represents the degree of sharpness of the unevenness, thereby representing the diffusive transmission degree of the transmitting light through the optical sheet to large angles. Namely, the magnitude of $Rz_{0.25}$ contributes to reduction of the reflection in the area apart from the center of the reflection area of the light source, especially the reflection around the edge portion of the area apart from the center thereof.

That $Rz_{0.25}$ is less than 0.170 μm means that diffusion to large angles is small. When $Rz_{0.25}$ is less than 0.170 μm, the diffusion to large angles is so small that the boundary between the reflection area and the non-reflection area of the light source cannot be blurred thereby leading to unsatisfactory anti-glare property. On the other hand, when $Rz_{0.25}$ is more than 0.400 μm, the ratio of the reflecting light which diffuses to large angles is so large that the contrast is deteriorated due to whitening. In addition, when $Rz_{0.25}$ is more than 0.400 μm, the image light diffuses to cause a decrease in the luminance, so that a powerful moving image cannot be displayed.

The condition (2) satisfies preferably 0.170 μm≤$Rz_{0.25}$≤0.370 μm, while more preferably 0.180 μm≤$Rz_{0.25}$≤0.350 μm.

Further, the present invention takes variance in the surface shape into consideration by the condition (3).

In the condition (3), the standard deviation SD of the arithmetic average roughness $Ra_{0.8}$ of JIS B0601: 1994 with a cut-off value of 0.8 mm is 0.015 μm or less. As described before, the unevenness of the low frequency component transmits the transmitting light through the optical sheet with diffusing to around the specular direction, and also reflects the reflecting light on the optical sheet surface with diffusing to around the specular direction. Namely, the unevenness of the low frequency component has significant impact to the transmitting and reflecting lights in the front direction, which is a viewer's central view point. Therefore, when the standard deviation SD of $Ra_{0.8}$, which represents the average roughness of the unevenness of the low frequency component, is more than 0.015 μm, the bright and dark display becomes uneven in the viewer's central view point, so that not only the powerful moving image cannot be displayed but also the contrast deteriorates. In addition, when SD is more than 0.015 μm, the anti-glare property to the light source center can be non-uniform.

The condition (3) satisfies preferably SD≤0.012 μm, while more preferably SD≤0.010 μm.

As described above, when the optical sheet of the present invention satisfies the conditions (1) to (3), not only excellent anti-glare property, contrast, and image clarity can be obtained but also the powerful moving image can be displayed. Among these effects, the effects to the image clarity and powerful moving image are especially eminent when the optical sheet of the present invention is disposed on the ultrahigh-definition display element.

In the optical sheet of the present invention, it is preferable that the arithmetic average roughness $Ra_{0.8}$ and $Rz_{0.8}$ of JIS B0601: 1994 with a cut-off value of 0.8 mm in the uneven surface satisfies the following condition (4).

$$0.230 \text{ μm} \leq Rz_{0.8} - Ra_{0.8} \leq 0.500 \text{ μm} \quad (4)$$

The condition (4) represents the degree of randomness and degree of sharpness of the unevenness of the low frequency component. When $Rz_{0.8}$-$Ra_{0.8}$ is made to 0.230 μm or more, the boundary between around the central portion in the reflection area of the light source and the peripheral portion thereof can be easily blurred thereby helping to improve the anti-glare property. In addition, when $Rz_{0.8}$-$Ra_{0.8}$ is made to 0.230 μm or more, the unevenness of the low frequency component becomes random so that the image light is prevented from concentrating to a certain angle thereby helping to prevent the scintillation (phenomenon that subtle luminance unevenness appears in the image light) from occurring. On the other hand, when $Rz_{0.8}-Ra_{0.8}$ is made to 0.500 µm or less, excessive diffusion of the image light can be avoided thereby helping to display the powerful moving image.

The condition (4) satisfies more preferably 0.240 µm≤$Rz_{0.8}-Ra_{0.8}$≤0.480 µm, while still more preferably 0.250 µm≤$Rz_{0.8}-Ra_{0.8}$≤0.450 µm.

In the optical sheet of the present invention, it is preferable that the arithmetic average roughness $Ra_{0.25}$ and $Rz_{0.25}$ of JIS B0601: 1994 with a cut-off value of 0.25 mm in the uneven surface satisfy the following condition (5).

$$0.130 \text{ µm} \leq Rz_{0.25}-Ra_{0.25} \leq 0.290 \text{ µm} \qquad (5)$$

The condition (5) represents the degree of randomness and degree of sharpness of the unevenness of the high frequency component. When $Rz_{0.25}-Ra_{0.25}$ is made to 0.130 µm or more, the boundary between the reflection area and non-reflection area of the light source can be easily blurred thereby helping to improve the anti-glare property. In addition, when $Rz_{0.25}-Ra_{0.25}$ is made to 0.130 µm or more, the unevenness of the high frequency component becomes random so that the image light is prevented from concentrating to a certain angle thereby helping to prevent scintillation (phenomenon that subtle luminance unevenness appears in the image light) from occurring. On the other hand, when $Rz_{0.25}-Ra_{0.25}$ is made to 0.290 µm or less, an increase in the ratio of the reflecting light which diffuses to large angles is suppressed, thereby helping to suppress a decrease in the contrast due to whitening.

The condition (5) satisfies more preferably 0.130 µm≤$Rz_{0.25}-Ra_{0.25}$≤0.280 µm, while still more preferably 0.150 µm≤$Rz_{0.25}-Ra_{0.25}$≤0.270 µm.

In the optical sheet of the present invention, it is preferable that $Ra_{0.25}$ and $Ra_{0.8}$ satisfy the following condition (6).

$$1.30 \leq Ra_{0.8}/Ra_{0.25} \leq 1.80 \qquad (6)$$

Satisfying the condition (6) means that Ra of the high and low frequency components exist in a good balance. When the condition (6) is satisfied, it helps not only to improve the anti-glare property, contrast, and image clarity but also to display the powerful moving image. In addition, when the condition (6) is satisfied, it helps to reduce the scintillation.

The condition (6) satisfies more preferably 1.32≤$Ra_{0.8}/Ra_{0.25}$≤1.70, while still more preferably 1.35≤$Ra_{0.8}/Ra_{0.25}$≤1.60.

In the optical sheet of the present invention, it is preferable that $Ra_{0.8}$ satisfies the following condition (7).

$$0.050 \text{ µm} \leq Ra_{0.8} \leq 0.120 \text{ µm} \qquad (7)$$

When $Ra_{0.8}$ is made to 0.050 µm or more, excessive concentration of the reflecting light to the specular direction can be suppressed thereby suppressing the reflection around the central portion in the reflection area of the light source, so that the anti-glare property can be improved. On the other hand, when $Ra_{0.8}$ is made to 0.120 µm or less, diffusion of the image light can be suppressed thereby helping to improve the image clarity. In addition, when $Ra_{0.8}$ is made to 0.120 µm or less, the decrease in the image luminance can be suppressed thereby helping to display the powerful moving image. Especially in the ultrahigh-definition display element (display element with the horizontal pixel number of 1920 or more, or with the pixel density of 250 ppi or more), the problem in the image clarity as well as in the display of moving image as described above tends to appear.

The condition (7) satisfies more preferably 0.050 µm≤$Ra_{0.8}$≤0.110 µm, while still more preferably 0.060 µm≤$Ra_{0.8}$≤0.100 µm.

In the optical sheet of the present invention, it is preferable that $Ra_{0.25}$ satisfies the following condition (8).

$$0.020 \text{ µm} \leq Ra_{0.25} \leq 0.100 \text{ µm} \qquad (8)$$

When $Ra_{0.25}$ is made to 0.020 µm or more, the anti-glare property of the area apart from the center of the reflection area of the light source can be improved. When $Ra_{0.25}$ is made to 0.100 µm or less, the diffusion to large angles can be reduced so that the contrast can be improved.

The condition (8) satisfies more preferably 0.020 µm≤$Ra_{0.25}$≤0.070 µm, while still more preferably 0.030 µm≤$Ra_{0.25}$≤0.055 µm.

In order to obtain the foregoing effects more easily, in the optical sheet of the present invention, it is preferable that $Rz_{0.8}$ and $Rz_{0.25}$ satisfy the following condition (9).

$$1.40 \leq Rz_{0.8}/Rz_{0.25} \leq 2.00 \qquad (9)$$

The condition (9) satisfies more preferably 1.50≤$Rz_{0.8}/Rz_{0.25}$≤1.90, while still more preferably 1.55≤$Rz_{0.8}/Rz_{0.25}$≤1.85.

The condition (6) satisfies more preferably 1.50≤$Ra_{0.8}/Ra_{0.25}$≤1.90, while still more preferably 1.55≤$Ra_{0.8}/Ra_{0.25}$≤1.85.

The optical sheet of the present invention can be used without particular restriction so far as the optical sheet has an uneven shape at least in one surface thereof and can transmit a light. The uneven shape may be in both surfaces of the optical sheet; however, in view of the handling convenience, image clarity, and powerful moving image, it is preferable that the uneven shape is in one surface while the other surface is almost smooth ($Ra_{0.8}$ of 0.02 µm or less).

The optical sheet may be monolayer of the uneven layer or plural layers having the uneven layer formed on a transparent substrate. From the viewpoints of handling convenience and easy production, the configuration in which the uneven layer is on the transparent substrate is preferable. The optical sheet may also be in the laminate structure in which plural optical members are adhered to each other in which the surface of the laminate structure has the foregoing surface shape.

The uneven surface may be formed by the method such as (a) physical or chemical treatment including emboss treatment, sand blast treatment, and etching treatment, (b) molding by using a mold, or (c) formation of a resin layer having an uneven surface by coating. Among these methods, in view of reproducibility of the uneven shape, (b) molding by using a mold is preferable, while in view of productivity and response to various shapes, (c) formation of the coat film by coating is preferable.

The uneven surface by the method (a) may be formed by physical or chemical treatment such as emboss treatment, sand blast treatment, or etching treatment to a transparent substrate or to a layer formed on a transparent substrate.

The uneven surface by the method (b) may be formed such that after making a mold which is complementary to the uneven surface, a material to form the uneven surface is poured into the mold, and then this is taken out from the mold. In this method, as the foregoing material, a material capable of composing the uneven layer is poured into the mold, followed by superimposing a transparent substrate onto it, and then taking out the uneven layer together with the transparent substrate, so that the optical sheet having the uneven layer formed on the transparent substrate can be obtained. Alternatively, by the method in which a material capable of composing a transparent substrate is poured into a mold followed by taking out this from the mold, the optical sheet composed of the transparent substrate monolayer and the uneven surface formed on the transparent substrate surface can be obtained.

In the case where a curable resin composition (thermosetting resin composition or resin composition curable by ionized radiation) is used as the material to be poured into the mold, it is preferable to cure the curable resin composition before taking it out from the mold.

Formation of the uneven surface by the mold is preferable because it is excellent in reproducibility of the uneven shape.

The uneven surface by the method (c) may be formed such that a coating solution to form the uneven layer including a resin component and particles is applied onto a transparent substrate by a heretofore known method such as gravure coating, bar coating, roll coating, or die coating, followed by drying and curing it as needed.

The decorative sheet of the present invention may be composed of a transparent substrate monolayer (in this case, surface of the transparent substrate is the uneven surface), or may have the uneven layer on the transparent substrate.

Transparent Substrate:

It is preferable that the transparent substrate of the optical sheet has optical transparency, smoothness, and heat resistance, and is excellent in mechanical strength. Illustrative example of the transparent substrate includes plastic films such as polyesters (PET, PEN, etc.), acryls, triacetyl cellulose (TAC), cellulose diacetate, cellulose acetate butyrate, polyamides, polyimides, polyether sulfones, polysulfones, polypropylene, polymethylpentene, polyvinyl chloride, polyvinyl acetal, polyether ketones, polycarbonates, polyurethanes, and amorphous olefin (Cyclo-Olefin-Polymer: COP). The transparent substrate may also be those having two or more plastic films adhered to each other.

Among them, TAC and acryls are preferable in view of optical transparency and optical isotropy. On the other and, COP and polyesters are preferable in view of excellent weather resistance. Meanwhile, in this specification, the term "acryls" means acrylic and/or methacrylic types.

Thickness of the transparent substrate is preferably 5 to 300 µm, while more preferably 30 to 200 µm.

In order to enhance adhesion property, surface of the transparent substrate may be coated in advance with paint, called an anchor material or a primer, besides a physical treatment such as a corona discharge treatment and an oxidation treatment.

In the acryl substrate, upon using a solvent for the coating solution to form the uneven layer or a low functional monomer, part of a component in the acryl substrate tends to elute thereinto. The eluted component of the acryl substrate flows into the uneven layer thereby pushing up the particles to the upper part in the uneven layer. When large particles in a micron order and small particles in a nanometer order are present as the particle mixture of the uneven layer, both the large particles contributing mainly to the low frequency unevenness and the small particles contributing mainly to the high frequency unevenness come together in the upper part of the uneven layer. This helps not only to form a mixture of the low frequency unevenness and the high frequency unevenness but also to form very fine unevenness.

In addition, in the acryl substrate, because the particles are pushed up to the upper part of the unevenness as mentioned above, the amount of the particles to be added so as to impart the anti-glare property can be reduced, so that not only the image clarity can be improved but also the more powerful moving image can be displayed. Meanwhile, because the acryl substrate component flows out into the uneven layer, adhesion of the acryl substrate with the uneven layer can be improved as well.

Even in a transparent substrate other than the acryl substrate, by selecting a resin and a solvent, the same effects as described above can be obtained.

The acryl binder which constitutes the acryl substrate is preferably a polymer obtained by polymerizing one or a combination of two or more of (meth)acrylate alkyl esters. More specifically, a polymer obtained by using methyl (meth)acrylate is preferable. Illustrative example of the acryl includes those described in Japanese Patent Laid-Open Publication No. 2000-230016, Japanese Patent Laid-Open Publication No. 2001-151814, Japanese Patent Laid-Open Publication No. 2002-120326, Japanese Patent Laid-Open Publication No. 2002-254544, and Japanese Patent Laid-Open Publication No. 2005-146084. Acryls having a cyclic structure such as a lactone cyclic structure and an imide cyclic structure may also be used.

In view of the balance between retention of the strength of the acryl substrate and the property to push up the particles in the uneven layer to an upper part thereof, the glass transition temperature (Tg) of the acryl binder is preferably 100 to 150° C., more preferably 105 to 135° C., while still more preferably 110 to 130° C.

The acryl substrate may include a binder component other than the acryl, but the rate of the acryl binder in the entire binder of the acryl substrate is preferably 80% or more by mass, while more preferably 90% or more by mass.

The acryl substrate may include organic microparticles. When the acryl substrate includes organic particles, upon elution of the component of the acryl substrate, the interface can easily become uneven, so that the adhesion thereof with the uneven layer can be improved.

With regard to the organic microparticles, rubber elastic body particles having a layer showing rubber elasticity is preferably used. The rubber elastic body particles may be the particles formed with only the rubber elastic layer or the particles having a multilayer structure including the layer showing the rubber elasticity as well as other layers. When the organic microparticles are the rubber elastic body particles, flexibility of the acryl substrate improves, and in addition, it helps to suppress formation of cracks by the solvent, etc.

The organic microparticles having a core-shell structure formed of nucleus and shell is preferably used.

Material of the organic microparticles is preferably transparent, so that illustrative example thereof includes olefinic elastic polymers, diene elastic polymers, styrene-diene elastic copolymers, and acryl elastic polymers. Among them, acryl elastic polymers whose internal haze can be suppressed so as to improve the transparency thereof are preferable.

Average particle diameter of the organic microparticles is preferably 10 to 400 nm, while more preferably 50 to 300 nm. When the average particle diameter is made to 10 nm or more, it helps to suppress propagation of the micro-cracks generated in the acryl substrate; and when the average particle diameter is made to 400 nm or less, increase in the haze can be suppressed.

Content (rate) of the organic microparticles in the acryl substrate is preferably 25 to 45% by mass relative to a total solid component of the acryl substrate. When the organic microparticles are included therein with this rate, it helps to suppress not only propagation of the micro-cracks generated in the acryl substrate, but also an increase in the haze.

Uneven Layer:

It is preferable that the uneven layer includes a resin component and particles.

Resin Component of the Uneven Layer:

In view of mechanical strength, it is preferable that the resin component of the uneven layer is a cured product of a curable resin composition.

The curable resin composition is exemplified by a thermosetting resin composition or a resin composition curable by ionized radiation. In order to further enhance the mechanical strength, a resin composition curable by ionized radiation is preferable. Namely, it is most preferable that the resin component of the uneven layer includes cured product of the resin composition curable by ionized radiation.

The thermosetting resin composition is the composition which includes at least a thermosetting resin; and thus, it is a resin composition that can be cured by heating.

Illustrative example of the thermosetting resin includes acryl resins, urethane resins, phenol resins, urea melamine resins, epoxy resins, unsaturated polyester resins, and silicone resins. In the thermosetting resin composition, a curing agent is added to these thermosetting resins, as needed.

The resin composition curable by ionized radiation is the composition including a compound having a functional group curable by ionized radiation (hereunder, this compound is also referred to as "ionized radiation curable compound"). Illustrative example of the functional group curable by ionized radiation includes ethylenic unsaturated bond groups such as a (meth)acryloyl group, a vinyl group, and an allyl group; an epoxy group, and an oxetanyl group. With regard to the ionized radiation curable compound, a compound having an ethylenic unsaturated bond group is preferable, wherein a compound having two or more of the ethylenic unsaturated bond group is more preferable, while in particular, a polyfunctional (meth)acrylate-based compound which has two or more of the ethylenic unsaturated bond group is still more preferable. With regard to the polyfunctional (meth)acrylate-based compound, any of a monomer or an oligomer thereof can be used.

Meanwhile, the ionized radiation means, among electromagnetic waves or charged particle beams, those having an energy quantum capable of polymerizing or crosslinking a molecule, wherein a ultra-violet beam (UV) or an electron beam (EB) is usually used; however, besides these, electromagnetic beams such as an X-ray and a γ-beam as well as charged particle beams such as an α-beam and an ion beam may be used as well.

Among the polyfunctional (meth)acrylate compounds, illustrative example of the bifunctional (meth)acrylate monomer includes ethylene glycol di(meth)acrylate, bisphenol A tetraethoxy diacrylate, bisphenol A tetrapropoxy diacrylate, and 1,6-hexanediol diacrylate.

Illustrative example of the (meth)acrylate monomer having three or more functionalities includes trimethylolpropane tri(meth)acrylate, pentaerythritol tri(meth)acrylate, pentaerythritol tetra(meth)acrylate, dipentaerythritol hexa(meth)acrylate, dipentaerythritol tetra(meth)acrylate, and isocyanuric acid-modified tri(meth)acrylate.

The foregoing (meth)acrylate monomer also includes those modified in part of the molecular skeleton thereof and thus, those being modified with an ethylene oxide group, a propylene oxide group, a caprolactone group, an isocyanuric acid group, an alkyl group, a cyclic alkyl group, an aromatic group, a bisphenol group, or the like, may also be used.

Illustrative example of the polyfunctional (meth)acrylate oligomer includes acrylate polymers such as urethane (meth)acrylates, epoxy (meth)acrylates, polyester (meth)acrylates, and polyether (meth)acrylates.

The urethane (meth)acrylate may be obtained, for example, by a reaction of a polyalcohol and an organic diisocyanate with a hydroxy (meth)acrylate.

Preferable epoxy (meth)acrylates are: a (meth)acrylate obtained by a reaction of an aromatic epoxy resin, an alicyclic epoxy resin, an aliphatic epoxy resin, or the like, these having three or more functionalities, with a (meth)acrylic acid; a (meth)acrylate obtained by a reaction of an aromatic epoxy resin, an alicyclic epoxy resin, an aliphatic epoxy resin, or the like, these having two or more functionalities, with a polybasic acid and a (meth)acrylic acid; and a (meth)acrylate obtained by a reaction of an aromatic epoxy resin, an alicyclic epoxy resin, an aliphatic epoxy resin, or the like, these having two or more functionalities, with a phenolic compound and a (meth)acrylic acid.

These ionized radiation curable compounds may be used singly or as a combination of two or more of them.

In the case where the transparent substrate is the acryl substrate, it is preferable that the ionized radiation curable compound includes a (meth)acrylate monomer having 1 to 4 functionalities. As described before, when the coating solution for formation of the uneven layer includes a low functionality monomer, this monomer elutes a component of the acryl substrate thereby pushing up the particles in the uneven layer to the upper part of the uneven layer, so that it helps to form the uneven shape of the present invention. In addition, because the eluted component of the acryl substrate flows into the uneven layer, adhesion of the acryl substrate with the uneven layer can be improved.

In the case where the transparent substrate is other than the acryl substrate, when the solvent capable of swelling or dissolving the transparent substrate is used and the ionized radiation curable compound includes the (meth)acrylate monomer having 1 to 4 functionalities, the effects equivalent to those described above can be obtained.

Meanwhile, in order to improve the mechanical strength of the uneven layer, among the (meth)acrylate monomers having 1 to 4 functionalities, it is more preferable to include (meth)acrylate monomers having 2 to 4 functionalities.

Specific example of the bifunctional (meth)acrylate monomer includes isocyanuric acid di(meth)acrylate, polyalkylene glycol di(meth)acrylate, 1,6-hexanediol di(meth)acrylate, and 1,9-nonanediol di(meth)acrylate. Specific example of the trifunctional (meth)acrylate monomer includes pentaerythritol tri(meth)acrylate and trimethylolpropane tri(meth)acrylate. Specific example of the tetrafunctional (meth)acrylate monomer includes ditrimethylolpropane tetra(meth)acrylate and pentaerythritol tetraacrylate (PETTA).

Molecular weight of the (meth)acrylate monomer having 1 to 4 functionalities is preferably 180 to 1000, more preferably 200 to 750, while still more preferably 220 to 450. When the molecular weight thereof is within the foregoing range, it helps to push up the particles in the uneven layer to the upper part of the uneven layer, and improve adhesion of the transparent substrate with the uneven layer.

When the (meth)acrylate monomer having 1 to 4 functionalities is used as the ionized radiation curable compound, content of the (meth)acrylate monomer having 1 to 4 functionalities is preferably 10 to 65% by mass, while more preferably 20 to 50% by mass, relative to a total solid component of the resin composition curable by ionized radiation.

When the (meth)acrylate monomer having 1 to 3 functionalities is used as the ionized radiation curable compound, in order to improve mechanical strength of the uneven layer, in the resin composition curable by ionized radiation, it is preferable to include a (meth)acrylate monomer and/or an oligomer having 4 or more functionalities, while more preferably to include a (meth)acrylate monomer and/or an oligomer having 4 to 6 functionalities.

Meanwhile, when a hydrophilic ionized radiation curable compound or a hydrophobic ionized radiation curable compound is solely included as the ionized radiation curable compound, the particles tend to readily aggregate in the uneven layer thereby impairing the balance between the high frequency component's unevenness and the low frequency component's unevenness, so that it becomes difficult to satisfy the conditions (1) to (3). In addition, because aggregation of the particles takes place randomly in the coat film, the low frequency component increases locally in the portion where the aggregation takes place. Therefore, when the hydrophilic ionized radiation curable compound or the hydrophobic ionized radiation curable compound is solely included as the ionized radiation curable compound, it becomes difficult to satisfy especially the condition (3).

Accordingly, it is preferable to include both the hydrophilic ionized radiation curable compound and the hydrophobic ionized radiation curable compound as the ionized radiation curable compounds in the resin composition curable by ionized radiation. Alternatively, it is preferable to include an ionized radiation curable compound having a property which is somewhere between hydrophilic and hydrophobic as the ionized radiation curable compound in the resin composition curable by ionized radiation.

When the hydrophilic ionized radiation curable compound and the hydrophobic ionized radiation curable compound are concurrently used, the mass ratio thereof is preferably 5:95 to 60:40, while more preferably 15:85 to 55:45.

The hydrophilic ionized radiation curable compounds are those having the pure water contact angle of 59 degrees or less, measured with the method described in Examples. The hydrophobic ionized radiation curable compounds are those having the pure water contact angle of 61 degrees or more, measured with the method described in Examples. The ionized radiation curable compounds having a property which is somewhere between hydrophilic and hydrophobic are those having the pure water contact angle of more than 59 degrees and less than 61 degrees, measured with the method described in Examples.

Illustrative example of the hydrophilic ionized radiation curable compound includes pentaerythritol triacrylate and tris(2-hydroxyethyl)isocyanurate triacrylate. Illustrative example of the hydrophobic ionized radiation curable compound includes dipentaerythritol hexaacrylate. Illustrative example of the ionized radiation curable compound having a property which is somewhere between hydrophilic and hydrophobic includes pentaerythritol tetra-acrylate.

When the ionized radiation curable compound is UV-curable, it is preferable that the composition curable by ionized radiation includes an additive such as a photo-polymerization initiator or a photo-polymerization accelerator.

The photo-polymerization initiator may be one or more compound selected from acetophenone, benzophenone, α-hydroxy alkylphenone, Michler ketone, benzoin, benzyl dimethyl ketal, benzoyl benzoate, α-acyloxime ester, thioxanthone, etc.

The photo-polymerization accelerators are those being capable of accelerating the curing rate by lowering the polymerization hindrance due to an air in the curing process, wherein one or more photo-polymerization accelerators selected from isoamyl p-dimethylaminobenzoate ester, ethyl p-dimethylaminobenzoate ester, etc. may be mentioned.

Particles in the Uneven Layer:

As to the particles in the uneven layer, to include the particles with a large size in a micron order is preferable (hereunder, this is sometimes referred to as "large particles"), while, as needed, to further include the particles with a small size in a nanometer order (hereunder, this is sometimes referred to as "small particles") is more preferable. When only the large particles are present in the uneven layer, there is a tendency that surface of the uneven layer in which the large particles are absent becomes almost smooth. However, when the small particles are included together with the large particles in the uneven layer, it helps to form a gentle slope in the place where the large particles are absent. The reason for this is presumed as follows: because presence of the small particles influences thixotropic property of the coating solution as well as drying property of the solvent, a usual leveling does not take place. Accordingly, when a gentle slope is formed also in the place where the large particles are absent, because of this slope, not only variance in the surface shape of the uneven layer is reduced but also the balance between the high frequency unevenness and the low frequency unevenness can be improved thereby helping to bring the conditions (1) to (3) within the afore-mentioned range.

Large Particles:

In order to readily obtain the afore-mentioned uneven shape, the average particle diameter of the large particles is preferably 1 to 8 μm, while more preferably 1.5 to 5 μm.

In the present invention, the average particle diameter of the large particles can be calculated by the procedures (1) to (3) shown below.

(1) The transmitted observation image of the optical sheet of the present invention is photographed by using an optical microscope. The magnification thereof is preferably 500 to 2000.

(2) Ten particles are arbitrarily extracted from the observation image, and then, the long and short diameters of each particle are measured; from the average of the long and short diameters, the particle diameter of each particle is calculated. The long diameter is the longest diameter in the image of each particle. The short diameter is obtained as follows: namely, when a line is drawn so as to perpendicularly intersect with the line constituting the long diameter at its central point, the distance between two points where this perpendicular line reaches the particle is measured as the short diameter.

(3) The same procedure is carried out for 5 times in the different observation images of the same sample, and the average particle diameter of the large particles is obtained from the number-average of the total 50 particle diameters.

With regard to the average primary particle diameter of the small particles to be mentioned later, first, the cross section of the optical sheet of the present invention is photographed by TEM or STEM. After photographing, by the same procedures as (2) and (3) described above, the average primary particle diameter of the small particles can be calculated. In TEM and STEM, it is preferable that the acceleration voltage is 10 to 30 kV and the magnification is 50,000 to 300,000.

With regard to the large particles, any of organic particles and inorganic particles can be used so far as they are light-transmissive. Also, the large particles may be any shape including spherical, disk-like, rugby-ball-like, and amorphous. Among these shapes, a spherical form is preferable, because the particles do not readily incline in the flow direction (MD direction) and the width direction (TD direction), and the unevenness balance in the low frequency component as well as the production stability can be improved. In the large particles, hollow particles, porous particles, and solid particles of the respective foregoing shapes may be used.

The organic particles may be the particles of polymethyl methacrylate, polyacryl-styrene copolymer, melamine resin, polycarbonate, polystyrene, polyvinyl chloride, benzoguanamine-melamine-formaldehyde condensate, silicone, fluorinated resin, polyester resin, etc.

The inorganic particles may be the particles of silica, alumina, zirconia, titania, etc.

Among these large particles, in view of easy dispersion control, the organic particles, especially the polyacryl-styrene copolymer particles, are preferable. In the polyacryl-styrene copolymer particles, the refractive index and the hydrophilic-hydrophobic degree can be easily controlled, so that the copolymer particles are excellent in the points that the internal haze as well as aggregation and/or dispersion can be readily controlled.

In order to readily obtain the afore-mentioned uneven shape, content of the large particles is preferably 0.2 to 15.0% by mass, more preferably 0.5 to 10.0% by mass, while still more preferably 1.0 to 6.0% by mass, relative to a total solid component to constitute the uneven layer.

The ratio of the average particle diameter of the large particles to the thickness of the uneven layer (large particles' average particle diameter/uneven layer thickness) is different depending on whether or not the small particles to be mentioned later are used concurrently.

When the small particles to be mentioned later are used concurrently with the large particles, in order to readily obtain the afore-mentioned uneven shape, the ratio of the average particle diameter of the large particles to the thickness of the uneven layer is preferably 0.15 to 0.50, while more preferably 0.20 to 0.40.

Small Particles:

In the small particles, in order to readily obtain the afore-mentioned uneven shape, the average primary particle diameter thereof is preferably 1 to 50 nm, more preferably 3 to 40 nm, while still more preferably 5 to 25 nm.

With regard to the small particles, inorganic particles of silica, alumina, zirconia, titania, etc. are preferable. Among them, silica is preferable in view of the transparency.

The small particles of reactive inorganic particles in which a reactive group is introduced by surface treatment are preferable. When the reactive group is introduced, a large quantity of small particles can be included in the uneven layer, so that it helps to obtain the afore-mentioned uneven shape.

With regard to the reactive group, a polymerizable unsaturated group is preferably used, wherein a photo-curable unsaturated group is preferable, while an unsaturated group curable by ionized radiation is particularly preferable. Specific example thereof includes ethylenic unsaturated bond such as a (meth)acryloyl group, a (meth)acryloyloxy group, a vinyl group, and an allyl group, as well as an epoxy group.

The reactive inorganic particles may be exemplified by the inorganic particles whose surface is treated with a silane coupling agent. The method for treating surface of the inorganic particles with a silane coupling agent includes a dry method in which the silane coupling agent is sprayed to the inorganic particles, and a wet method in which the inorganic particles are dispersed in a solvent followed by addition of the silane coupling agent so as to cause the reaction.

Content of the small particles is preferably 0.1 to 10.0% by mass, more preferably 0.2 to 5.0% by mass, while still more preferably 0.3 to 1.5% by mass, relative to a total solid component to constitute the uneven layer. When the content thereof is made within this range, by controlling the leveling property as well as suppressing the contraction of the uneven layer due to polymerization, the afore-mentioned uneven shape can be easily obtained.

In order to readily obtain the afore-mentioned uneven shape, the ratio of the contents of the small particles to the large particles (small particle content/large particle content) in the uneven layer is preferably 0.001 to 1.0, more preferably 0.01 to 0.8, while still more preferably 0.1 to 0.7.

In view of curling suppression, a mechanical strength, and a balance between hardness and tenacity, thickness of the uneven layer is preferably 2 to 10 µm, while more preferably 4 to 8 µm.

Thickness of the uneven layer can be obtained, for example, by measuring the thicknesses of 20 places in the cross section image obtained by the scanning transmission electron microscope (STEM) followed by calculation of an average value of these 20 values. It is preferable that the acceleration voltage of STEM is 10 to 30 kV and the magnification thereof is 1000 to 7000.

Solvent:

In the coating solution to form the uneven layer, in order to control the viscosity thereof as well as to dissolve or disperse each component, a solvent is usually used. Depending on the kind of solvent, the surface condition of the uneven layer after the coating and drying processes changes, so that it is preferable to select the solvent by taking into consideration a saturated vapor pressure of the solvent, a permeability of the solvent into the transparent substrate, and the like.

Specific example of the solvent includes ketones (acetone, methyl ethyl ketone, methyl isobutyl ketone, cyclohexanone, etc.), ethers (dioxane, tetrahydrofuran, etc.), aliphatic hydrocarbons (hexane, etc.), alicyclic hydrocarbons (cyclohexane, etc.), aromatic hydrocarbons (toluene, xylene, etc.), halogenated carbons (dichloromethane, dichloroethane, etc.), esters (methyl acetate, ethyl acetate, butyl acetate, etc.), alcohols (butanol, cyclohexanol, etc.), cellosolves (methyl cellosolve, ethyl cellosolve, etc.), cellosolve acetates, sulfoxides (dimethyl sulfoxide, etc.), and amides (dimethyl formamide, dimethyl acetamide, etc.), as well as a mixture of them.

When drying of the solvent is too slow or too fast, the leveling property of the uneven layer becomes excessive or insufficient, so that it becomes difficult to control the uneven shape in the afore-mentioned range. Therefore, content of the solvent having the relative evaporation rate (relative evaporation rate of n-butyl acetate is taken as 100) of 100 to 180 is preferably 50% or more by mass, more preferably 70% or more by mass, still more preferably 90% or more by mass, while utmost preferably 100% by mass, relative to the entire solvent. The relative evaporation rate of the solvent is more preferably 100 to 150.

Illustrative examples of the relative evaporation rate are 195 for toluene, 465 for methyl ethyl ketone (MEK), 118 for methyl isobutyl ketone (MIBK), and 68 for propylene glycol monomethyl ether (PGME).

Kind of the solvent can also influence dispersibility of the small particles. For example, MIBK is suitable, because MIBK is excellent in dispersibility, and the uneven shape can be easily controlled with MIBK in the afore-mentioned range.

When the transparent substrate is the acryl substrate, because the acryl substrate tends to be readily swelled or dissolved by the solvent, it is preferable to select the solvent which can appropriately swell or dissolve the acryl substrate.

With regard to the solvent like this, alcohols (methanol, ethanol, isopropanol, and 1-butanol) are preferable; in other solvents, solvents having more carbon atoms tend to be more preferable, especially solvents having faster evaporation rate tend to be more preferable. Illustrative examples of them are methyl isobutyl ketone for the ketones, toluene for the aromatic hydrocarbons, and propylene glycol monomethyl ether for the glycols, including a mixture of them.

Among these solvents, a solvent including one or more solvents selected from methyl isobutyl ketone, isopropanol, 1-butanol, and propylene glycol monomethyl ether is especially preferable.

The solvent which swells or dissolves the TAC substrate includes MEK, cyclohexanone, and MIBK.

Content of the solvent in the coating solution to form the uneven layer is not particularly restricted, but preferably 150 to 250 parts by mass, while more preferably 175 to 220 parts by mass, relative to 100 pats by mass of the solid component in the coating solution to form the uneven layer.

In order to make easier to obtain the uneven shape within the afore-mentioned range, during the time that the uneven layer is formed, it is preferable to control the drying condition. The drying condition can be controlled by drying temperature and wind rate in a dryer. Specifically, preferably the drying temperature is 30 to 120° C. and the drying wind rate is 0.2 to 50 m/s. In addition, because leveling of the uneven layer is controlled by the drying condition, it is preferable that the ionized radiation is applied after drying.

In order to appropriately smoothen the surface unevenness (to make a suitable amount of the low frequency component present) thereby helping to obtain the uneven shape within the afore-mentioned range, it is preferable that the coating solution to form the uneven layer includes a leveling agent. With regard to the leveling agent, fluorine-based agents and silicone-based agents can be mentioned, wherein the silicone-based leveling agents are preferable. Addition amount of the leveling agent is preferably 0.01 to 1.5% by mass, while more preferably 0.05 to 1.0% by mass, relative to a total solid component of the coating solution to form the uneven layer.

The optical sheet may have a functional layer such as an anti-reflective layer, an anti-fouling layer, and an anti-static layer on the surface having the uneven shape and/or on the surface opposite to the uneven shape. In the case where the uneven layer is formed on the transparent substrate, besides the afore-mentioned place, the functional layer may be formed between the transparent substrate and the uneven layer.

Optical Properties:

In the optical sheet, in order to readily express the effects of the present invention, it is preferable that the total light transmittance (JIS K7361-1: 1997), the haze (JIS K7136: 2000), and the transmitted image clarity (JIS K7374: 2007) are within the ranges described below. Meanwhile, all the total light transmittance, the haze, and the transmitted image clarity are the average values of 15 samples measured once for each sample.

The total light transmittance is preferably 80% or more, more preferably 85% or more, while still more preferably 90% or more.

The haze is preferably 0.5 to 10.0%, more preferably 0.6 to 5.0%, while still more preferably 0.7 to 3.0%.

The transmitted image clarity $C_{0.125}$, which is the value obtained when the width of the optical comb is 0.125 mm, is preferably 65.0 to 90.0%, more preferably 70.0 to 90.0%, while still more preferably 75.0 to 85.0%.

The transmitted image clarity $C_{0.25}$, which is the value obtained when the width of the optical comb is 0.25 mm, is preferably 65.0 to 90.0%, more preferably 70.0 to 90.0%, while still more preferably 75.0 to 85.0%.

In addition, the absolute value of the difference between $C_{0.25}$ and $C_{0.125}$ is preferably less than 2.0%, while more preferably 1.5% or less. When the absolute value of the difference between $C_{0.25}$ and $C_{0.125}$ is within the afore-mentioned range, the variance in the degree of reflection around the center of the light source can be suppressed so that the anti-glare property can be further improved.

It is preferable that the optical sheet of the present invention is used as a constituent member of the display device such as a liquid crystal display device, and the uneven surface of the optical sheet is disposed so as to face to a viewer's side (light exit side of the display device). Further, it is preferable that the optical sheet of the present invention is disposed in the outermost surface of the display device, and the uneven surface of the optical sheet is disposed so as to face to a viewer's side (light exit side of the display device).

[Polarizing Plate]

The polarizing plate of the present invention, comprising protective films on both sides of a polarizer, wherein at least one of the protective films comprises the optical sheet of the present invention with the uneven surface of the optical sheet facing in a direction opposite to the polarizer.

Any type of the polarizer may be used so far as it has a function that only a light having a specific vibration direction can transmit through it, so that illustrative example thereof includes: a PVA-type polarizer in which a PVA-type film or the like is drawn and then dyed with iodonium or a dichroic dye; a polyene-type polarizer which is a dehydrated PVA or a dehydrochlorinated polyvinyl chloride; a reflection-type polarizer using a cholesteric liquid crystal; and a thin crystal film type polarizer.

Thickness of the polarizer is preferably 2 to 30 μm, while more preferably 3 to 30 μm.

The polarizing plate of the present invention is the one in which as the optical sheet of the present invention at least one of the protective films on both sides of the polarizer is disposed in such a way that the uneven surface of the optical sheet is faced to an opposite to the polarizer. With the composition like this, the polarizing plate having the effects of the optical sheet of the present invention can be obtained.

With regard to the other protective film, there is no particular restriction so far as it has a light transmitting property, so that TAC, acryl, COP, polyester, etc. may be used.

Thickness of the protective film is preferably 5 to 300 μm, while more preferably 30 to 200 μm.

[Method for Selecting the Optical Sheet]

The method for selecting an optical sheet of the present invention is the method for selecting the optical sheet, wherein at least one surface thereof is an uneven surface, comprising selecting an optical sheet having an uneven surface which satisfies following conditions (1) to (3), provided that $Rz_{0.8}$ is a ten-point average roughness according to JIS B0601: 1994 with a cut-off value of 0.8 mm, $Rz_{0.25}$ is a ten-point average roughness according to JIS B0601: 1994 with a cut-off value of 0.25 mm, and SD is a standard deviation of an arithmetic average roughness $Ra_{0.8}$ according to JIS B0601: 1994 with a cut-off value of 0.8 mm:

$$0.300 \ \mu m \leq Rz_{0.8} \leq 0.650 \ \mu m \quad (1)$$

$$0.170 \ \mu m \leq Rz_{0.25} \leq 0.400 \ \mu m \quad (2)$$

$$SD \leq 0.015 \ \mu m \quad (3)$$

Essential judgement condition to select the optical sheet of the present invention is to satisfy the conditions (1) to (3).

According to the method for selecting the optical sheet of the present invention, even without incorporating the optical sheet into a display device, the optical sheet can be selected which is excellent in anti-glare property, contrast, and image clarity as well as capable of displaying a powerful moving image; and thus, quality of the optical sheet can be efficiently controlled.

It is preferable that the judgement condition to select the optical sheet of the present invention further includes one or more additional conditions selected from the conditions (4) to (9) below. When the additional judgement condition is satisfied, the optical sheet having the foregoing effects can be selected more accurately.

$$0.230 \ \mu m \leq Rz_{0.8} - Ra_{0.8} \leq 0.500 \ \mu m \quad (4)$$

$$0.130 \ \mu m \leq Rz_{0.25} - Ra_{0.25} \leq 0.290 \ \mu m \quad (5)$$

$$1.30 \leq Ra_{0.8} / Ra_{0.25} \leq 1.80 \quad (6)$$

$$0.050 \ \mu m \leq Ra_{0.8} \leq 0.120 \ \mu m \quad (7)$$

$$0.020 \ \mu m \leq Ra_{0.25} \leq 0.100 \ \mu m \quad (8)$$

$$1.40 \leq Rz_{0.8} / Rz_{0.25} \leq 2.00 \quad (9)$$

With regard to the additional judgement conditions, it is more preferable to satisfy two or more of the conditions (4) to (9), still more preferable to satisfy three or more of the conditions, while utmost preferable to satisfy all of the conditions.

It is preferable that the judgement conditions (1) to (9) satisfy the suitable value ranges of the conditions (1) to (9) described in the optical sheet of the present invention.

[Method for Manufacturing the Optical Sheet]

The method for manufacturing the optical sheet of the present invention is to manufacture the optical sheet, wherein at least one surface thereof is an uneven surface, comprising manufacturing the optical sheet in such a way that the uneven surface thereof satisfies following conditions (1) to (3), provided that $Rz_{0.8}$ is a ten-point average roughness according to JIS B0601: 1994 with a cut-off value of 0.8 mm, $Rz_{0.25}$ is a ten-point average roughness according to JIS B0601: 1994 with a cut-off value of 0.25 mm, and SD is a standard deviation of an arithmetic average roughness $Ra_{0.8}$ according to JIS B0601: 1994 with a cut-off value of 0.8 mm:

$$0.300 \ \mu m \leq Rz_{0.8} \leq 0.650 \ \mu m \quad (1)$$

$$0.170 \ \mu m \leq Rz_{0.25} \leq 0.400 \ \mu m \quad (2)$$

$$SD \leq 0.015 \ \mu m \quad (3)$$

Essential manufacturing condition in the method for manufacturing the optical sheet of the present invention is to satisfy the conditions (1) to (3).

In the method for manufacturing the optical sheet of the present invention, it is preferable to control the manufacturing condition in such a way as to satisfy, as the additional conditions, one or more conditions (4) to (9) in the selection method of the optical sheet, more preferable to control the manufacturing condition in such a way as to satisfy two or more of the conditions, still more preferable to control the manufacturing condition in such a way as to satisfy three or more of the conditions, while utmost preferable to control the manufacturing condition in such a way as to satisfy all of the conditions.

According to the method for manufacturing the optical sheet of the present invention, the optical sheet which is excellent in anti-glare property, contrast, and image clarity as well as capable of displaying a powerful moving image can be efficiently manufactured.

It is preferable that the manufacturing conditions (1) to (9) satisfy the suitable value ranges of the conditions (1) to (9) described in the optical sheet of the present invention.

[Display Device]

In the display device A of the present invention, comprising one or more optical members disposed on a viewer's side of a display element, and at least one of the optical members comprises the optical sheet of the present invention, with the uneven surface of the optical sheet is disposed to face the viewer's side.

In the display device B of the present invention, comprising one or more optical members is disposed on a viewer's side of a display element, and at least one of the optical members comprises the polarizing plate of the present invention, with the uneven surface of the optical sheet of the polarizing plate is disposed to face the viewer's side.

In the display device A, it is preferable that the optical sheet is disposed in the outermost surface of the display device A and that the uneven surface of the optical sheet is disposed so as to face to the viewer's side. In the display device B, it is preferable that the polarizing plate is disposed in the outermost surface of the display device B and that the uneven surface of the polarizing plate is disposed so as to face to the viewer's side. Meanwhile, the viewer's side means the light exit side.

Illustrative example of the display element to constitute the display device includes a liquid crystal display element, a plasma display element, and an organic EL display element.

Specific composition of the display element is not particularly restricted. For example, in the case of the liquid crystal display element, the basic composition comprises a lower glass substrate, a lower transparent electrode, a liquid crystal layer, an upper transparent electrode, a color filter, and an upper glass substrate, arranged sequentially in this order, wherein in the case of the ultrahigh-definition display element, the lower and upper transparent electrodes are patterned highly densely.

In the display element, it is preferable that the horizontal pixel number is 1920 or more, or the pixel density is 250 ppi or more. These display elements are for the ultrahigh-definition display element, wherein amount of a light per one pixel is small, so that it is readily influenced by diffusion, etc. of an external light. Therefore, in view of easy expression of the effects of the present invention, the ultrahigh-definition display element is suitable.

The display device of the present invention may have a touch panel on the display element in which the optical sheet of the present invention is disposed as the constituent member of the touch panel. Meanwhile, in this embodiment, too, the uneven surface of the optical sheet needs to face to the viewer's side. Further, in this embodiment, it is preferable that the optical sheet is disposed in the outermost surface of the touch panel and that the uneven surface of the optical sheet is disposed so as to face to the viewer's side.

Illustrative example of the touch panel includes an electrostatic capacitance-type touch panel, a resistance film-type touch panel, an optical-type touch panel, an ultrasonic-type touch panel, and an electromagnetic induction-type touch panel.

The resistance film-type touch panel has a basic composition in which a pair of top and bottom transparent substrates having conductive films is disposed via a spacer such that the conductive films face to each other, wherein the basic composition is connected to a circuit.

The electrostatic capacitance-type touch panel is classified into a surface electrostatic capacitance-type touch panel, a projection electrostatic capacitance-type touch panel, etc., wherein the projection electrostatic capacitance-type touch panel is widely used. The projection electrostatic capacitance-type touch panel has a basic composition in which an X-axis electrode and a Y-axis electrode orthogonal to the X electrode are disposed via an insulator, wherein the composition is connected to a circuit. More specific embodiments thereof include: (1) an embodiment in which the X electrode and the Y electrode are formed on separate surfaces of the transparent substrate; (2) an embodiment in which the X electrode, an insulator layer, and the Y electrode are formed on the transparent substrate sequentially in this order; (3) an embodiment in which the X electrode is formed on one transparent substrate and the Y electrode is formed on another transparent substrate, wherein these electrodes are laminated through an adhesive layer. Additionally, an embodiment in which a separate transparent substrate is laminated on the above-described basic embodiments may be mentioned.

EXAMPLES

Hereunder, the present invention will be described in more detail using Examples, but the present invention is by no means limited by these Examples. Unless otherwise particularly described, "parts" and "%" are mass-based.

1. Measurement and Evaluation of Physical Properties of the Optical Sheet

The properties of the optical sheets of Examples and Comparative Examples were measured and evaluated as described below. The results are described in Table 1, etc.

1-1. Measurement of Surface Roughness

The optical sheets of Examples and Comparative Examples were cut to obtain 60 specimens for each, with a size of 5-cm square. Then, the arithmetic average roughness $Ra_{0.8}$ and the ten-point average roughness $Rz_{0.8}$ according to JIS B0601: 1994 with a cut-off value λc of 0.8 mm, as well as the arithmetic average roughness $Ra_{0.25}$ and the ten-point average roughness $Rz_{0.25}$ according to JIS B0601: 1994 with a cut-off value λc of 0.25 mm were measured for the respective specimens. The average values of 60 specimens for each were taken as $Ra_{0.8}$, $Rz_{0.8}$, $Ra_{0.25}$, and $Rz_{0.25}$ for each Example and Comparative Example. The standard deviation SD of $Ra_{0.8}$ of 60 specimens was taken as SD for each Example and Comparative Example. The measurement was made by using a surface roughness measurement instrument (trade name: SE-3400, manufactured by Kosaka Laboratory Ltd.) with the following measurement conditions.

[Stylus of the Surface Roughness Detecting Unit]

Trade name: SE 2555N (front curvature radius: 2 μm, apex angle: 90 degrees, material of construction: diamond, manufactured by Kosaka Laboratory Ltd.)

[Measurement Conditions of the Surface Roughness Measurement Instrument]

Measured at λc 0.25 mm or λc 0.8 mm
Evaluation length: 5 times of the cut-off value λc
Stylus traveling rate: 0.1 mm/s
Spare length: (cut-off value λc)×2
Vertical magnification: 10000
Horizontal magnification: 50
Skid: not used (no contact to the measurement surface)
Cut-off filter: Gaussian filter
JIS mode: JIS 1994
Dead zone level: 10%
tp/PC curve: normal
Sampling mode: c=1500

1-2. Anti-Glare Property

A black acryl plate (trade name: Cosmo Glass DFA 502K, manufactured by Kuraray Co., Ltd.) having 2-mm thickness was adhered to a transparent substrate side of the optical sheet through a transparent adhesive layer (trade name: PDC-S1, refractive index: 1.55, manufactured by Panac Corp.) having 50 μm thickness to obtain an evaluation specimen (size: 10 cm×10 cm). This specimen was placed in a horizontal plane, and 2 meters above it a fluorescent lamp was disposed and spotted on the evaluation specimen; and then, visual observation was made from various angles under the circumstance of the illuminance of 800 to 1200 Lx on the evaluation specimen. The evaluation was made by 15 persons according to the assessment standard described below, and then the average point of 15 persons was calculated. As a result, the average point of less than 1.0 points was evaluated as "C", the average point of 1.0 points or more and less than 1.6 points was evaluated as "B", the average point of 1.6 points or more and less than 2.3 points was evaluated as "A", and the average point of 2.3 points or more was evaluated as "AA".

3 points: white reflection is observed in the entire specimen surface, so that brightness and darkness cannot be clearly recognized.

2 points: reflection area of the fluorescent lamp can be recognized as a bright portion, but the shape thereof cannot be recognized as the fluorescent lamp.

1 points: the boundary between around the central part of the reflection area of the fluorescent lamp (the part corresponding to the core of the fluorescent lamp) and the peripheral part thereof is blurred, so that the boundary cannot be recognized. In addition, the boundary of the reflection and non-reflection areas of the fluorescent lamp is blurred, so that the boundary cannot be recognized.

0 points: the boundary between around the central part of the reflection area of the fluorescent lamp (the part corresponding to the core of the fluorescent lamp) and the peripheral part thereof can be clearly recognized. Or, the boundary of the reflection and non-reflection areas of the fluorescent lamp can be clearly recognized.

1-3. Contrast

The evaluation specimen prepared in the above 1-2 was placed in a horizontal plane, and a fluorescent lamp was radiated to the surface of the optical sheet from a direction of 45 degrees; and visual observation was made from the angle of the specular reflection direction of the radiated light. The contrast was evaluated by 15 persons according to the assessment standard described below, and then the average point of 15 persons was calculated. As a result, the average point of less than 1.0 points was evaluated as "E", the average point of 1.0 points or more and less than 1.5 points was evaluated as "D", the average point of 1.5 points or more and less than 2.0 points was evaluated as "C", the average point of 2.0 points or more and less than 2.5 points was evaluated as "B", and the average point of 2.5 points or more was evaluated as "A".

3 points: very good in blackness
2 points: good in blackness
1 points: low blackness and somewhat whitish
0 points: very whitish 1-4. Image Clarity On the display element with the pixel number of 3840×2160 (trade name: REGZA 55G 20X, manufactured by Toshiba Corp.), the optical sheet was disposed such that the uneven surface thereof faces to the outside direction; and then, the image of the display element under the displayed condition was visually observed (still image of a fountain in the day time taken with SH camera program of a smartphone (trade name: SH-05G, manufactured by Sharp Corp.). The image clarity was evaluated by 15 persons according to the assessment standard described below, and then the average point of 15 persons was calculated. As a result, the average point of less than 1.0 points was evaluated as "E", the average point of 1.0 points or more and less than 1.5 points was evaluated as "D", the average point of 1.5 points or more and less than 2.0 points was evaluated as "C", the average point of 2.0 points or more and less than 2.5 points was evaluated as "B", and the average point of 2.5 points or more was evaluated as "A". The same evaluation as above was carried out by using the display element with the pixel number of 2420×1080 (trade name: BRAVIA KJ-32W700C, manufactured by Sony Corp.).

3 points: very good image clarity
2 points: good image clarity
1 points: ambivalent
0 points: poor image clarity 1-5. Display Performance of Moving Image (Powerfulness of Moving Image)

On the commercially available smartphone (trade name: iPhone 5c, manufactured by Apple Inc., pixel density: about 330 ppi (calculated from image size of 4-inch diagonal, aspect ratio of about 9:16, and pixel number of 640×1136)), the optical sheet was disposed such that the uneven surface thereof faces to the outside direction; and then, the moving image displayed was visually observed (moving image of a fountain in the day time taken for 30 seconds with SH camera program of a smartphone (trade name: SH-05G, manufactured by Sharp Corp.)). The display performance of the moving image was evaluated by 15 persons according to the assessment standard described below, and then the average point of 15 persons was calculated. As a result, the average point of less than 1.0 points was evaluated as "E", the average point of 1.0 points or more and less than 1.5 points was evaluated as "D", the average point of 1.5 points or more and less than 2.0 points was evaluated as "C", the average point of 2.0 points or more and less than 2.5 points was evaluated as "B", and the average point of 2.5 points or more was evaluated as "A".

3 points: very powerful moving image
2 points: powerful moving image
1 points: ambivalent
0 points: poor moving image 1-6. Scintillation A light box with luminance of 1500 $cd/m^2$ (white surface light source), a black matrix glass with 250 ppi, and the optical sheet were piled up sequentially in this order from a bottom, and then, the scintillation was visually observed from a distance of about 30 cm at various angles of up, down, left, and right. The scintillation was evaluated by 15 persons according to the assessment standard described below, and then the average point of 15 persons was calculated. As a result, the average point of less than 1.0 points was evaluated as "E", the average point of 1.0 points or more and less than 1.5 points was evaluated as "D", the average point of 1.5 points or more and less than 2.0 points was evaluated as "C", the average point of 2.0 points or more and less than 2.5 points was evaluated as "B", and the average point of 2.5 points or more was evaluated as "A".

3 points: no scintillation is felt even with careful observation
2 points: scintillation is felt with careful observation, but hardly felt with usual observation
1 points: scintillation is significantly felt with usual observation
0 points: scintillation is very significantly felt with usual observation 1-7. Transmitted Image Clarity The optical sheets of Examples and Comparative Examples were cut to obtain 15 specimens for each, with a size of 5-cm square. Then, by using the image clarity measurement instrument (trade name: ICM-1T, manufactured by Suga Test Instruments Co., Ltd.), the transmitted image clarity $C_{0.125}$ with the optical comb's width of 0.125 mm and the transmitted image clarity $C_{0.25}$ with the optical comb's width of 0.25 mm were measured for each specimen in accordance with JIS K7105: 1981. Light was incident on the transparent substrate side. The average value of 15 specimens was taken as $C_{0.125}$ as well as $C_{0.25}$ for each Example and Comparative Example.

1-8. Haze

The optical sheets of Examples and Comparative Examples were cut to obtain 15 specimens for each, with a size of 5-cm square. Then, by using the haze meter (HM-150, manufactured by Murakami Color Research Laboratory Co., Ltd.), the haze of each specimen was measured in accordance with JIS K-7136: 2000. Light was incident on the transparent substrate side. The average value of 15 specimens was taken as the haze for each Example and Comparative Example.

1-9. Pure Water Contact Angle

The pure water contact angles of the ionized radiation curable compounds used in the coating solutions 1 to 9 for forming the uneven layer in Examples and Comparative Examples were measured in the way described below. The pure water contact angle of each of the ionized radiation curable compounds is described in the prescription of the coating solutions 1 to 9 for forming the uneven layer.

<Measurement Method of Contact Angle>

The coating solution comprising 50 parts of each ionized radiation curable compound, 1.5 parts of a photo-polymerization initiator (Irgacure 184, manufactured by BASF SE), and 100 parts of MIBK is applied with the coating amount of 5 $g/m^2$ onto a TAC film having the thickness of 80 μm, and then it is dried at 70° C. for one minute. Then, the ionized radiation curable compound is cured by UV irradiation (under a nitrogen atmosphere (oxygen concentration of 200 ppm or less) with radiation amount of 50 $mJ/cm^2$) to obtain a specimen with a size of 5 cm square having the ionized radiation curable compound cured on the TAC film. For each ionized radiation curable compound, 15 specimens are prepared; and pure water is dropped onto the cured film of the specimen thus obtained, and then the pure water contact angle of the cured film is measured in accordance with JIS R3257: 1999. The average value of 15 specimens was taken as the pure water contact angle of each of the ionized radiation curable compound.

2. Preparation of the Optical Sheet

Example 1

The uneven layer-forming coating solution 1 with the prescription described below was applied by a bar coating method onto the 40-μm acryl substrate including as the binder a polymer obtained mainly from methyl methacrylate and core-shell type rubber particles having the 3-layer structure comprising the innermost layer of a hard polymer obtained mainly from methyl methacrylate, the intermediate layer of a soft elastic body obtained mainly form butyl acrylate, and the outermost layer of a hard polymer obtained mainly from methyl methacrylate; and then, it was dried at 70° C. with the wind rate of 5 m/s for 30 seconds. Then, the uneven layer is formed by UV irradiation under a nitrogen atmosphere (oxygen concentration of 200 ppm or less) with the cumulative light amount of 100 mJ/cm$^2$ to obtain the optical sheet. Thickness of the uneven layer was 7.5 m.

<Uneven Layer-Forming Coating Solution 1>

| | |
|---|---|
| Trifunctional acrylate monomer (tris(2-hydroxyethyl)isocyanurate triacrylate) (pure water contact angle: 55 degrees) | 20 parts |
| Trifunctional urethane acrylate oligomer (pure water contact angle: 66 degrees) | 30 parts |
| Hexafunctional acrylate monomer (DPHA) (pure water contact angle: 66 degrees) | 50 parts |
| Photo-polymerization initiator (Irgacure 184, manufactured by BASF SE) | 8 parts |
| Silicone-based leveling agent (TSF 4460, manufactured by Momentive Performance Materials Inc.) | 0.1 parts |
| Transmissive particle 1 (spherical polyacryl-styrene copolymer; manufactured by Sekisui Chemical Co., Ltd.) (average particle diameter: 2.5 μm, refractive index: 1.517) | 5 parts |
| Transmissive particle 2 (spherical polyacryl-styrene copolymer; manufactured by Sekisui Chemical Co., Ltd.) (average particle diameter: 2.0 μm, refractive index: 1.517) | 0.1 parts |
| Inorganic ultrafine particle (silica having a reactive functional group introduced into the surface thereof, solvent: MIBK, solid content: 30%, manufactured by Nissan Chemical Industries Ltd.) (average primary particle diameter: 12 nm) | 2 parts |
| Solvent 1 (MIBK) | 200 parts |

Example 2

The same procedure as Example 1 was followed to obtain the optical sheet, except that the acryl substrate in Example 1 was changed to the acryl substrate described below and that the uneven layer-forming coating solution 1 was changed to the uneven layer-forming coating solution 2 described below.

<Uneven Layer-Forming Coating Solution 2>

| | |
|---|---|
| Trifunctional acrylate monomer (PETA) (pure water contact angle: 58 degrees) | 50 parts |
| Hexafunctional urethane acrylate oligomer (pure water contact angle: 66 degrees) | 50 parts |
| Photo-polymerization initiator (Irgacure 184, manufactured by BASF SE) | 8 parts |
| Silicone-based leveling agent (TSF 4460, manufactured by Momentive Performance Materials Inc.) | 0.1 parts |
| Transmissive particle 1 (spherical polyacryl-styrene copolymer; manufactured by Sekisui Chemical Co., Ltd.) (average particle diameter: 2.5 μm, refractive index: 1.517) | 3.5 parts |
| Transmissive particle 2 (spherical polyacryl-styrene copolymer; manufactured by Sekisui Chemical Co., Ltd.) (average particle diameter: 2.0 μm, refractive index: 1.517) | 0.1 parts |
| Inorganic ultrafine particle (silica having a reactive functional group introduced into the surface thereof, solvent: MIBK, solid content: 30%, manufactured by Nissan Chemical Industries Ltd.) (average primary particle diameter: 12 nm) | 2 parts |
| Solvent 1 (MIBK) | 200 parts |

<Production of Acryl Substrate of Example 2>

Pellets comprising methyl methacrylate-methyl acrylate copolymer (glass transition temperature: 130° C.) were melt kneaded, and the polymer was extruded through a die clearance by a melt extruding method with removing foreign matters through a filter. Next, with cooling, the polymer was drawn by 1.2 times in a mechanical direction, and then by 1.5 times in a width direction to obtain the acryl substrate having the thickness of 40 μm.

Example 3

The same procedure as Example 1 was followed to obtain the optical sheet, except that the acryl substrate in Example 1 was changed to TAC (TD 80UL, thickness of 80 μm, manufactured by Fujifilm Corp.) and that the uneven layer-forming coating solution 1 was changed to the uneven layer-forming coating solution 3 described below.

<Uneven Layer-Forming Coating Solution 3>

| | |
|---|---|
| Trifunctional acrylate monomer (PETA) (pure water contact angle: 58 degrees) | 10 parts |
| Tetrafunctional acrylate monomer (PETTA) (pure water contact angle: 60 degrees) | 40 parts |
| Hexafunctional urethane acrylate oligomer (pure water contact angle: 66 degrees) | 50 parts |
| Photo-polymerization initiator (Irgacure 184, manufactured by BASF SE) | 8 parts |
| Silicone-based leveling agent (TSF 4460, manufactured by Momentive Performance Materials Inc.) | 0.1 parts |
| Transmissive particle 1 (spherical polyacryl-styrene copolymer; manufactured by Sekisui Chemical Co., Ltd.) (average particle diameter: 2.5 μm, refractive index: 1.517) | 3.0 parts |
| Transmissive particle 2 (spherical polyacryl-styrene copolymer; manufactured by Sekisui Chemical Co., Ltd.) (average particle diameter: 2.0 μm, refractive index: 1.517) | 0.1 parts |
| Inorganic ultrafine particle (silica having a reactive functional group introduced into the surface thereof, solvent: MIBK, solid content: 30%, manufactured by Nissan Chemical Industries Ltd.) (average primary particle diameter: 12 nm) | 2 parts |
| Solvent 1 (MIBK) | 200 parts |

Example 4

The same procedure as Example 1 was followed to obtain the optical sheet, except that the acryl substrate in Example 1 was changed to TAC (TD 80UL, thickness of 80 μm, manufactured by Fujifilm Corp.) and that the uneven layer-forming coating solution 1 was changed to the uneven layer-forming coating solution 4 described below.

<Uneven Layer-Forming Coating Solution 4>

| | |
|---|---|
| Tetrafunctional acrylate monomer (PETTA) (pure water contact angle: 60 degrees) | 100 parts |
| Photo-polymerization initiator (Irgacure 184, manufactured by BASF SE) | 8 parts |
| Silicone-based leveling agent (TSF 4460, manufactured by Momentive Performance Materials Inc.) | 0.1 parts |
| Transmissive particle 1 (spherical polyacryl-styrene copolymer; manufactured by Sekisui Chemical Co., Ltd.) (average particle diameter: 2.5 μm, refractive index: 1.517) | 5 parts |
| Transmissive particle 2 (spherical polyacryl-styrene copolymer; manufactured by Sekisui Chemical Co., Ltd.) (average particle diameter: 2.0 μm, refractive index: 1.517) | 1 parts |
| Inorganic ultrafine particle (silica having a reactive functional group introduced into the surface thereof, solvent: MIBK, solid content: 30%, manufactured by Nissan Chemical Industries Ltd.) (average primary particle diameter: 12 nm) | 2 parts |
| Solvent 1 (MIBK) | 200 parts |

Comparative Example 1

The same procedure as Example 1 was followed to obtain the optical sheet, except that the acryl substrate in Example 1 was changed to TAC (TD 80UL, thickness of 80 μm, manufactured by Fujifilm Corp.), and that the uneven layer-forming coating solution 1 was changed to the uneven layer-forming coating solution 5 with the prescription described below, and that thickness of the uneven layer was made to 2 μm.

<Uneven Layer-Forming Coating Solution 5>

| | |
|---|---|
| Trifunctional acrylate monomer (PETA) (pure water contact angle: 58 degrees) | 100 parts |
| Fine inorganic particle (gel method amorphous silica; manufactured by Fuji Silysia Chemical Ltd.) (hydrophobic treatment, average particle diameter: 4.1 μm) | 14 parts |
| Photo-polymerization initiator (Irgacure 184, manufactured by BASF SE) | 5 parts |
| Silicone-based leveling agent (TSF 4460, manufactured by Momentive Performance Materials Inc.) | 0.2 parts |
| Solvent 1 (toluene) | 150 parts |
| Solvent 2 (MIBK) | 35 parts |

Comparative Example 2

The same procedure as Example 1 was followed to obtain the optical sheet, except that the acryl substrate in Example 1 was changed to TAC (TD 80UL, thickness of 80 μm, manufactured by Fujifilm Corp.) and that the uneven layer-forming coating solution 1 was changed to the uneven layer-forming coating solution 6 with the prescription described below.

<Uneven Layer-Forming Coating Solution 6>

| | |
|---|---|
| Trifunctional acrylate monomer (PETA) (pure water contact angle: 58 degrees) | 50 parts |
| Hexafunctional urethane acrylate oligomer (pure water contact angle: 66 degrees) | 50 parts |
| Photo-polymerization initiator (Irgacure 184, manufactured by BASF SE) | 3 parts |
| Silicone-based leveling agent (TSF 4460, manufactured by Momentive Performance Materials Inc.) | 0.1 parts |
| Transmissive particle (styrene-acryl copolymer particle, refractive index: 1.555) (average particle diameter: 3.5 μm) | 10 parts |
| Solvent 1 (toluene) | 145 parts |
| Solvent 2 (cyclohexanone) | 60 parts |

Comparative Example 3

The same procedure as Example 1 was followed to obtain the optical sheet, except that the acryl substrate in Example 1 was changed to TAC (TD 80UL, thickness of 80 μm, manufactured by Fujifilm Corp.), and that the uneven layer-forming coating solution 1 was changed to the uneven layer-forming coating solution 7 with the prescription described below, and that thickness of the uneven layer was made to 4.5 μm.

<Uneven Layer-Forming Coating Solution 7>

| | |
|---|---|
| Trifunctional acrylate monomer (PETA) (pure water contact angle: 58 degrees) | 90 parts |
| Acryl polymer (molecular weight: 75,000, manufactured by Mitsubishi Rayon Co., Ltd.) (pure water contact angle: 70 degrees) | 10 parts |
| Photo-polymerization initiator (Irgacure 184, manufactured by BASF SE) | 3 parts |
| Silicone-based leveling agent (TSF 4460, manufactured by Momentive Performance Materials Inc.) | 0.1 parts |
| Transmissive particle (spherical polystyrene particle, manufactured by Soken Chemical & Engineering Co., Ltd.)) (average particle diameter: 3.5 μm, refractive index: 1.59) | 12 parts |
| Solvent 1 (toluene) | 145 parts |
| Solvent 2 (cyclohexanone) | 60 parts |

Comparative Example 4

The same procedure as Example 1 was followed to obtain the optical sheet, except that the acryl substrate in Example 1 was changed to TAC (TD 80UL, thickness of 80 μm, manufactured by Fujifilm Corp.) and that the uneven layer-forming coating solution 1 was changed to the uneven layer-forming coating solution 8 with the prescription described below.

<Uneven Layer-Forming Coating Solution 8>

| | |
|---|---|
| Tetrafunctional urethane acrylate oligomer (pure water contact angle: 66 degrees) | 60 parts |
| Tetrafunctional acrylate monomer (PETTA) (pure water contact angle: 60 degrees) | 40 parts |
| Photo-polymerization initiator (Irgacure 184, manufactured by BASF SE) | 8 parts |

| Silicone-based leveling agent (TSF 4460, manufactured by Momentive Performance Materials Inc.) | 0.1 parts |
| --- | --- |
| Transmissive particle 1 (spherical polyacryl-styrene copolymer; manufactured by Sekisui Chemical Co., Ltd.) (average particle diameter: 2.5 μm, refractive index: 1.515) | 5 parts |
| Transmissive particle 2 (spherical polyacryl-styrene copolymer; manufactured by Sekisui Chemical Co., Ltd.) (average particle diameter: 2.0 μm, refractive index: 1.515) | 0.1 parts |
| Inorganic ultrafine particle (silica having a reactive functional group introduced into the surface thereof, solvent: MIBK, solid content: 30%, manufactured by Nissan Chemical Industries Ltd.) (average primary particle diameter: 12 nm) | 2 parts |
| Solvent 1 (MIBK) | 200 parts |

Comparative Example 5

The uneven layer-forming coating solution 9 of the prescription described below was applied onto the TAC substrate (TD 60UL, thickness of 60 μm, manufactured by Fujifilm Corp.) by a bar coating method so as to give 10 μm as the thickness thereof after drying, followed by drying and UV irradiation, to form the uneven layer. Next, the overcoat layer forming solution of the prescription described below was applied onto the uneven layer by a bar coating method so as to give 0.1 μm as the thickness thereof after drying, followed by drying and UV irradiation, thereby forming the overcoat layer to obtain the optical sheet.

<Uneven Layer-Forming Coating Solution 9>

| Trifunctional acrylate monomer (PETA) (pure water contact angle: 58 degrees) | 17.9 parts |
| --- | --- |
| Hexafunctional urethane acrylate oligomer (pure water contact angle: 66 degrees) | 81.2 parts |
| Photo-polymerization initiator (Irgacure 184, manufactured by BASF SE) | 3 parts |
| Fluorine-based leveling agent (Megafac RS-75, manufactured by DIC Corp.) | 0.2 parts |
| Fumed Silica (average primary particle diameter: 10 nm) | 0.7 parts |
| Solvent 1 (methyl isobutyl ketone) | 4 parts |
| Solvent 2 (toluene) | 180 parts |
| Solvent 3 (cyclohexanone) | 30 parts |
| Solvent 4 (isopropyl alcohol) | 70 parts |

<Overcoat Layer Forming Solution>

| Trifunctional acrylate monomer (PETA) | 10 parts |
| --- | --- |
| Urethane acrylate (UV1700B, manufactured by Nippon Synthetic Chemical Industry Co., Ltd.) | 43 parts |
| Photo-polymerization initiator (Irgacure 184, manufactured by BASF SE) | 3 parts |
| Fluorine-based leveling agent (Megafac RS-75, manufactured by DIC Corp.) | 1 parts |
| Hollow silica (average primary particle diameter: 50 nm) | 5 parts |
| Solvent 1 (methyl isobutyl ketone) | 135 parts |
| Solvent 2 (methyl ethyl ketone) | 232 parts |
| Solvent 3 (propylene glycol monomethyl ether acetate) | 176 parts |

TABLE 1

| | | Example | | | | Comparative Example | | | | |
| --- | --- | --- | --- | --- | --- | --- | --- | --- | --- | --- |
| | | 1 | 2 | 3 | 4 | 1 | 2 | 3 | 4 | 5 |
| Surface roughness | $Ra_{0.8}$ (μm) | 0.091 | 0.082 | 0.062 | 0.074 | 0.393 | 0.165 | 0.144 | 0.071 | 0.075 |
| | SD (μm) | 0.009 | 0.011 | 0.010 | 0.008 | 0.011 | 0.021 | 0.018 | 0.022 | 0.011 |
| | $Rz_{0.8}$ (μm) | 0.418 | 0.395 | 0.329 | 0.507 | 2.433 | 0.735 | 0.698 | 0.382 | 0.298 |
| | $Rz_{0.8} - Ra_{0.8}$ (μm) | 0.327 | 0.313 | 0.267 | 0.433 | 2.040 | 0.570 | 0.554 | 0.311 | 0.223 |
| | $Ra_{0.25}$ (μm) | 0.054 | 0.054 | 0.039 | 0.053 | 0.381 | 0.113 | 0.120 | 0.057 | 0.044 |
| | $Rz_{0.25}$ (μm) | 0.229 | 0.240 | 0.192 | 0.320 | 1.526 | 0.461 | 0.415 | 0.222 | 0.204 |
| | $Rz_{0.25} - Ra_{0.25}$ (μm) | 0.175 | 0.186 | 0.153 | 0.267 | 1.145 | 0.348 | 0.295 | 0.165 | 0.160 |
| | $Ra_{0.8}/Ra_{0.25}$ | 1.691 | 1.507 | 1.586 | 1.396 | 1.031 | 1.455 | 1.202 | 1.246 | 1.705 |
| | $Rz_{0.8}/Rz_{0.25}$ | 1.826 | 1.644 | 1.715 | 1.583 | 1.594 | 1.593 | 1.681 | 1.721 | 1.461 |
| Anti-glare property | | B | B | B | B | AA | A | AA | B | C |
| Contrast | | A | A | A | A | D | C | E | B | A |
| Image clarity (3840 × 2160 pixel) | | A | A | A | A | E | C | D | B | A |
| Image clarity (2420 × 1080 pixel) | | A | A | A | A | D | B | C | A | A |
| Display performance of moving image (330 ppi) | | B | B | A | A | E | D | E | C | A |
| Scintillation (250 ppi) | | B | B | B | B | A | B | A | B | B |
| $C_{0.125}$ (%) | | 80.0 | 78.0 | 80.9 | 79.3 | 1.2 | 35.5 | 21.7 | 70.5 | 74.0 |
| $C_{0.25}$ (%) | | 80.6 | 78.1 | 79.7 | 80.0 | 1.3 | 33.2 | 21.1 | 71.3 | 75.4 |
| Haze (%) | | 0.8 | 1.6 | 0.8 | 1.8 | 23.0 | 11.0 | 39.6 | 3.5 | 0.3 |

From the results in Table 1, it can be confirmed that the optical sheets and display devices which satisfy the conditions (1) to (3) are excellent in anti-glare property, contrast, and image clarity, as well as capable of displaying the powerful moving image.

INDUSTRIAL APPLICABILITY

The optical sheet of the present invention is useful in the points that it is excellent in anti-glare property, contrast, and image clarity, as well as capable of displaying the powerful moving image.

The invention claimed is:

1. An optical sheet, wherein at least one surface of the optical sheet is an uneven surface, and the uneven surface satisfies following conditions (1) to (3), provided that $Rz_{0.8}$ is a ten-point average roughness according to JIS B0601: 1994 with a cut-off value of 0.8 mm, $Rz_{0.25}$ is a ten-point average roughness according to JIS B0601: 1994 with a cut-off value of 0.25 mm, and SD is a standard deviation of an arithmetic average roughness $Ra_{0.8}$ according to JIS B0601: 1994 with a cut-off value of 0.8 mm:

$$0.300 \ \mu m \leq Rz_{0.8} \leq 0.650 \ \mu m \tag{1}$$

$$0.170 \ \mu m \leq Rz_{0.25} \leq 0.400 \ \mu m \tag{2}$$

$$SD \leq 0.015 \ \mu m. \tag{3}$$

2. The optical sheet according to claim 1, wherein the arithmetic average roughness $Ra_{0.8}$ and $Rz_{0.8}$ of JIS B0601: 1994 with a cut-off value of 0.8 mm in the uneven surface satisfies following condition (4)

$$0.230 \ \mu m \leq Rz_{0.8} - Ra_{0.8} \leq 0.500 \ \mu m. \tag{4}$$

3. The optical sheet according to claim 1, wherein the optical sheet has an uneven layer on a transparent substrate, and a front surface of the uneven layer side is the uneven surface.

4. The optical sheet according to claim 3, wherein the transparent substrate is an acryl substrate.

5. A polarizing plate, comprising protective films on both sides of a polarizer, wherein at least one of the protective films comprises the optical sheet of claim 1 with the uneven surface of the optical sheet facing in a direction opposite to the polarizer.

6. A display device, comprising one or more optical members disposed on a viewer's side of a display element, and at least one of the optical members comprises the polarizing plate according to claim 5, with the uneven surface of the optical sheet of the polarizing plate is disposed to face the viewer's side.

7. The display device according to claim 6, wherein the display element has a horizontal pixel number of 1920 or more, or a pixel density of 250 ppi or more.

8. A display device, comprising one or more optical members disposed on a viewer's side of a display element, and at least one of the optical members comprises the optical sheet according to claim 1, with the uneven surface of the optical sheet disposed to face the viewer's side.

9. The display device according to claim 8, wherein the display element has a horizontal pixel number of 1920 or more, or a pixel density of 250 ppi or more.

10. A method for selecting an optical sheet, wherein at least one surface thereof is an uneven surface, comprising selecting an optical sheet having an uneven surface which satisfies following conditions (1) to (3), provided that $Rz_{0.8}$ is a ten-point average roughness according to JIS B0601: 1994 with a cut-off value of 0.8 mm, $Rz_{0.25}$ is a ten-point average roughness according to JIS B0601: 1994 with a cut-off value of 0.25 mm, and SD is a standard deviation of an arithmetic average roughness $Ra_{0.8}$ according to JIS B0601: 1994 with a cut-off value of 0.8 mm:

$$0.300 \ \mu m \leq Rz_{0.8} \leq 0.650 \ \mu m \tag{1}$$

$$0.170 \ \mu m \leq Rz_{0.25} \leq 0.400 \ \mu m \tag{2}$$

$$SD \leq 0.015 \ \mu m. \tag{3}$$

11. A method for manufacturing an optical sheet, wherein at least one surface thereof is an uneven surface, comprising manufacturing the optical sheet in such a way that the uneven surface thereof satisfies following conditions (1) to (3), provided that $Rz_{0.8}$ is a ten-point average roughness according to JIS B0601: 1994 with a cut-off value of 0.8 mm, $Rz_{0.25}$ is a ten-point average roughness according to JIS B0601: 1994 with a cut-off value of 0.25 mm, and SD is a standard deviation of an arithmetic average roughness $Ra_{0.8}$ according to JIS B0601: 1994 with a cut-off value of 0.8 mm:

$$0.300 \ \mu m \leq Rz_{0.8} \leq 0.650 \ \mu m \tag{1}$$

$$0.170 \ \mu m \leq Rz_{0.25} \leq 0.400 \ \mu m \tag{2}$$

$$SD \leq 0.015 \ \mu m. \tag{3}$$

* * * * *